United States Patent [19]

Jo Lane et al.

[11] Patent Number: 4,661,577
[45] Date of Patent: Apr. 28, 1987

[54] AMINOFUNCTIONAL POLYSILOXANES

[75] Inventors: Kimberley Jo Lane, Clifton Park; Frank J. Traver, Troy, both of N.Y.

[73] Assignee: General Electric Company, Waterford, N.Y.

[21] Appl. No.: 782,654

[22] Filed: Oct. 1, 1985

[51] Int. Cl.$^4$ .............................................. C08G 77/00
[52] U.S. Cl. ...................................... 528/10; 427/387; 528/14; 528/31; 528/34; 528/36; 528/37; 528/38; 528/43
[58] Field of Search ................... 528/10, 14, 34, 31, 528/36, 37, 38, 43

[56] References Cited

U.S. PATENT DOCUMENTS

| | | | |
|---|---|---|---|
| 2,921,950 | 1/1960 | Jex | 556/425 |
| 3,033,815 | 5/1962 | Pike et al. | 528/38 |
| 3,355,424 | 11/1967 | Brown | 528/33 |
| 3,890,269 | 6/1975 | Martin | 528/14 |
| 4,152,346 | 5/1979 | Seiler et al. | 556/413 |
| 4,247,592 | 1/1981 | Kalinowski | 428/266 |
| 4,419,391 | 12/1983 | Tanaka et al. | 528/37 X |
| 4,439,592 | 3/1984 | Maass et al. | 528/14 |

*Primary Examiner*—Thurman K. Page

[57] ABSTRACT

There are provided substantially trialkylsiloxy terminated polysiloxanes having at least one amino or substituted amino group linked to at least one trifunctional siloxy unit of said polysiloxane through an alkylene or arylene bridge. Emulsions of such polysiloxanes as well as methods for treating fabrics therewith are also provided.

13 Claims, No Drawings

AMINOFUNCTIONAL POLYSILOXANES

BACKGROUND OF THE INVENTION

The present invention relates to novel aminofunctional polysiloxanes, emulsions thereof, and to methods for using such emulsions in the treatment of textiles. More particularly, the present invention is concerned with emulsions of trialkylsiloxy terminated polysiloxanes having at least one amino or substituted amino group linked to one or more trifunctional siloxy units through an alkylene bridge. Such compositions are particularly useful for imparting improved hand to textile fabrics.

It is known to treat textile fibers, especially cellulosic and synthetic fibers, with organopolysiloxanes to impart properties such as water repellency. It is also known to treat textile fabric with aminofunctional silicone fluids to confer desirable properties such as "hand" to the fabric. Generally, the aminofunctional silicone fluids are terminated with reactive groups such as hydroxyl or alkoxyl. Kalinowski, in U.S. Pat. No. 4,247,592, teaches treating synthetic textiles with triorganosiloxy endblocked polydiorganosiloxanes (i.e. nonreactive terminal groups) having amino or substituted amino groups attached through an alkylene bridge to monofunctional and/or difunctional siloxy units. Kalinowski also teaches that trace amounts of other siloxane units in the aminofunctional silicone, such as $SiO_2$ and $RSiO_{1.5}$, which are normally present as impurities in commercial polydiorganosiloxanes may be present. Preferably, however, there are no $SiO_2$ or $RSiO_{1.5}$ units therein.

The composition of Kalinowski that is applied to the textile may consist solely of the aminofunctional silicone or it may be a liquid composition prepared by dissolving, dispersing, or emulsifying the aminofunctional silicone fluid in a suitable medium such as an organic liquid or water. An advantage of such triorganosiloxy terminated aminofunctional silicone fluids is that they permit the artisan to utilize the silicone fluid in the presence of reactive organic finishes without undesirable reactions between the silicone fluid and organic finishing compositions.

U.S. Pat. No. 2,921,950 to Jex et al. discloses polysiloxanes with reactive terminal groups having siloxy units of the formula $H_2NCH_2CH_2CH_2SiO_{1.5}$ and $R_nSiO_{(4-n)/2}$, where R is selected from alkyl and aryl radicals and n has an average value of from 1 to 3 inclusive. Such compositions are said to be useful as sizes for fibrous glass materials employed in combination with thermosetting resins. In addition, such polymers are said to be useful in the production of oils and resins suitable for use as lubricants and molding compositions.

U.S. Pat. No. 3,033,815 to Pike et al. describes copolymeric aminoalkylpolysiloxanes employed as starting materials which contain both

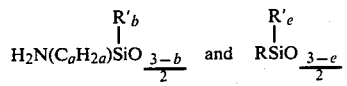

structural units, where R is an alkyl or aryl radical, R' is an alkyl or aryl radical, a is an integer of at least 3, b is an integer from 0 to 2 inclusive, and e is an integer from 0 to 2 inclusive. Consideration of the method for preparing such compositions makes clear that the terminal groups will be reactive groups such as hydroxyl or alkoxyl.

U.S. Pat. No. 3,355,424 to Brown also discloses polyaminoalkyl substituted organopolysiloxanes having reactive terminal groups and aminoalkyl moieties bonded to difunctional and/or trifunctional siloxy units through an alkylene bridge.

U.S. Pat. No. 3,890,269 to Martin provides a novel method for preparing known aminofunctional organopolysiloxanes. Those skilled in the art will appreciate that the resultant aminofunctional silicone compositions also contain reactive terminal groups.

U.S. Pat. No. 4,152,346 to Seiler et al. describes a method for making beta-aminosiloxanes having repeating structural units of the formula

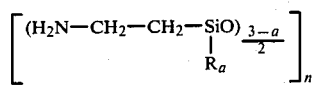

where R is an aliphatic radical of 1 to 10 carbon atoms, a is 0 or 1, and n is an integer greater than 2. Consideration of the specification discloses that the beta-aminosiloxanes contain terminal alkoxyl radicals.

SUMMARY OF THE INVENTION

It is an object of the present invention to provide novel aminofunctional silicone compositions particularly useful in the treatment of textiles.

It is another object of the present invention to provide emulsions of aminofunctional silicone compositions substantially free of reactive terminal groups which can be employed in the presence of reactive organic finishes.

Another object of the present invention is to provide methods for making the aforesaid aminofunctional silicone compositions and emulsions thereof, as well as to provide methods for treating textiles.

Accordingly, there are provided novel trialkylsiloxy terminated polysiloxanes having at least one amino or substituted amino group linked to at least one trifunctional siloxy unit through an alkylene bridge. In an especially preferred embodiment of the present invention the aminofunctional silicone fluids have the general formula:

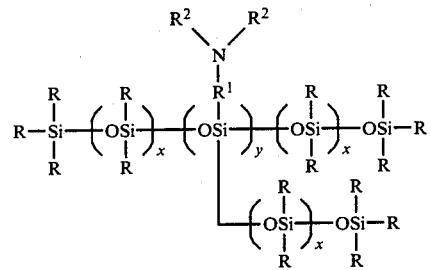

where each R is an independently selected substituted or unsubstituted hydrocarbon radical; each $R^1$ is an independently selected divalent arylene, alkarylene or alkylene radical; each $R^2$ is independently selected from hydrogen, substituted and unsubstituted hydrocarbon radicals, and amino radicals of the formula $-R^1N(R^2)_2$, where $R^1$ and $R^2$ are as previously defined; each x is an independently selected integer equal to or greater than zero; y is an integer equal to or greater than 1; and the viscosity is from about 10 centipoise to about 5000 centipoise at 25° C. More than one block of aminofunctional siloxy units can be present and some of the aminofunctional siloxy units can be difunctional. Preferably, at least 50 mole percent of the aminofunctional siloxy units are trifunctional. It is also contemplated that at least 50 mole percent of the aminofunctional siloxy units are trifunctional. It is also contemplated that the aminofunctional siloxy units can be randomly dispersed rather than being present in blocks.

DESCRIPTION OF THE INVENTION

In its broadest aspect, the present invention is directed to substantially trialkylsiloxy terminated polysiloxanes having at least one amino or substituted amino group linked to at least one trifunctional siloxy unit ($SiO_{1.5}$) through an alkylene bridge.

A particularly preferred embodiment of the aminofunctional polysiloxanes of the present invention relates to compositions having the general formula

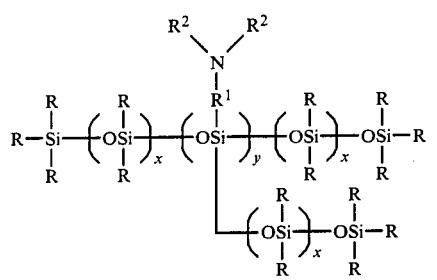

(I)

were each R is an independently selected substituted or unsubstituted hydrocarbon radical; each $R^1$ is an independently selected divalent arylene, alkarylene or alkylene radical; each $R^2$ is independently selected from hydrogen, substituted and unsubstituted hydrocarbon radicals, and amino radicals of the formula $—R^1N(R^2)_2$, where $R^1$ and $R^2$ are as previously defined; each x is an independently selected integer equal to or greater than zero; y is an integer equal to or greater than 1; and the viscosity is from about 10 centipoise to about 5000 centipoise at 25° C.

The R radicals can be any substituted or unsubstituted hydrocarbon radical conventionally bonded to the silicone atoms of polysiloxanes and includes, for example, alkyl radicals such as methyl, ethyl, propyl, butyl and the like; aryl radicals such as phenyl; alkenyl radicals such as vinyl and allyl; aralkyl radicals such as phenylethyl; alkaryl radicals such as benzyl; and radicals wherein one or more hydrogen atoms of any of the foregoing is replaced with a halogen, cyano, amino or the like, for example, cyanoethyl, trifluoropropyl, and chlorophenyl. Most preferably, the R radicals are all methyl or a mixture of a major amount of methyl and a minor amount of phenyl, cyanoethyl, trifluoropropyl, vinyl or mixture thereof.

$R^1$ can be any divalent arylene, alkanylene or alkylene radical; preferably an alkylene radical of the general formula —$C_nH_{2n}$— such as

—$CH_2$—,

—$CH_2CH_2$—,

—$CH_2CH_2CH_2$—,

—$CH_2CH(CH_3)CH_2$—, or

—$CH_2CH_2CH_2CH_2$—.

Generally, n can have a value of from 1 to about 10, but preferably is from 3 to 6, inclusive. Most preferably n equals 3 because it is readily available or easily synthesized. It is also contemplated that non-reactive atoms may be present in the alkylene bridge, for example, an —O— or —S— may be present between alkylene units.

$R^2$ can be hydrogen, any of the radicals defined by R, or an amino group or substituted amino group of the formula —$R^1N(R^2)_2$. Preferably, one of the $R^2$ radicals bonded to nitrogen is hydrogen and the other $R^2$ radical bonded to nitrogen is a radical of the formula —$(CH_2)_nNH_2$, where n is an integer from 1 to 10 and, preferably, from 2 to 4, inclusive.

From the foregoing the artisan will appreciate that representative amino and substituted amino groups which are bonded to triorganosiloxy units through an alkylene bridge in accordance with the present invention include

—$CH_2CH_2CH_2NH_2$

—$CH_2CH_2CH_2NHCH_2CH_2NH_2$

—$CH_2CH_2$—O—$CH_2CH_2NHCH_2CH_2CH_2NH_2$

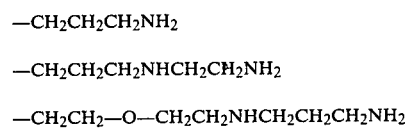

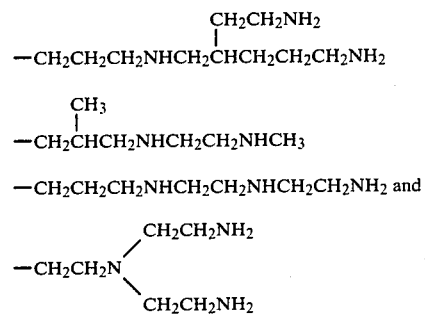

—$CH_2CH_2CH_2NHCH_2CH_2NHCH_2CH_2NH_2$ and

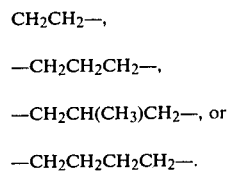

Other variations will be obvious to those of ordinary skill in the art.

The aminofunctional polysiloxanes of the present invention can be prepared by any suitable method. The present inventors have found that a particularly effective method involves equilibrating a trialkylsiloxy terminated polydiorganosiloxane such as hexamethyldisiloxane; a cyclopolysiloxane such as octamethylcyclotetrasiloxane; and a trialkoxyaminosilane such as aminoethylaminopropyltrimethoxysilane. Preferably, the equilibration is effected at a temperature greater than about 150° C. in the presence of a basic equilibration catalyst such as potassium hydroxide. Those skilled in the art will readily be able to conduct such an equilibration without undue experimentation.

Alternatively, a polydiorganosiloxane having suitably reactive trifunctional siloxy units, such as ≡SiH or ≡SiCH$_2$CH$_2$CH$_2$Cl, may be reacted with CH$_2$≡CHCH$_2$NHCH$_2$CH$_2$NH$_2$ or H$_2$NCH$_2$CH$_2$NH$_2$, respectively, to provide an analagous polysiloxane wherein the reactive groups have each been converted to —CH$_2$CH$_2$CH$_2$NHCH$_2$CH$_2$NH$_2$ groups. Small amounts of unreacted —SiH or ≡SiCH₂CH₂CH₂Cl groups may remain as an impurity.

It should be noted that there is no particular viscosity limitation on the compositions of the present invention, however, the emulsions of the present invention are most easily prepared from aminopolysiloxanes of the invention which have a viscosity of from about 10 centipoise to about 5000 centipoise at 25° C. More preferably, the viscosity of the aminopolysiloxane is from about 25 centipoise to about 1500 centipoise and, most preferably, is from about 100 centipoise to about 750 centipoise at 25° C.

The artisan will appreciate that it is not critical that the aminofunctional siloxy units be present in blocks and may, if desired, be randomly dispersed on the polymer chain. Also, it should be understood that there may be present other siloxy units, for example, $CH_3SiO_{1.5}$ units,

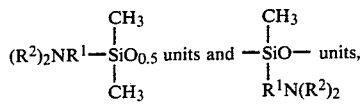

without departing from the spirit of the invention or the scope of the appended claims. Preferably, at least about 50 mole percent of the aminofunctional siloxy units are trifunctional siloxy units and, more preferably, at least about 75 mole percent of the aminofunctional siloxy units are trifunctional siloxy units. In especially preferred embodiments of the present invention the amine equivalent of the polysiloxane range from about 0.1 to about 2.5 and, more preferably, from about 0.5 to about 1.5. By "amine equivalent" is meant milliequivalent of amine per gram of fluid. Those skilled in the art will readily be able to ascertain the amine equivalent, for example, by a strong acid titration using an acid such as perchloric acid.

Textile fabrics, for example, polyester, polyester cotton, polyester rayon, cotton, rayon, nylon and the like, can be treated directly with the aminofunctional polysiloxanes of the present invention, however, it is preferable that an emulsion of the aminofunctional polysiloxanes by employed.

Emulsion compositions for practicing the textile treating method of the present invention can be prepared according to known methods using a suitable emulsifying agent such as a nonionic emulsifying agent, a cationic emulsifying agent, or a mixture thereof. Many suitable emulsifiers and combinations of emulsifiers will suggest themselves to persons skilled in the art, however, for purposes of the present invention, alkylphenoxypolyoxyethylene glycol surfactants such as octylphenoxypolyoxyethylene glycol (e.g. TRITON®X45, X100, X405, available from Rohm and Haas); nonylphenoxypolyoxyethylene glycol (Igepal® CO850, available from GAF Company); and the like, and complex quaternary ammonium salts such as methylpolyoxyethylene (15) cocoammonium chloride (95% Ethoquad®C125, available from Armak Co.) and dimethylsoyaamonium chloride (74% Arquad®2S-75, available from Armak Co.) are preferred. Emulsifiers generating free acids should be avoided as they may neutralize the amino radicals of the polysiloxane.

If desired, a small amount of acetic acid or the like may be added to assist in dispersing the polymer into the aqueous phase of the emulsion. Optional adjuvants, such as a biocide, may also be included in the emulsion compositions of the present invention.

Especially preferred emulsions are prepared by emulsion polymerization, for example, by modifying the teachings of Hyde et al. in U.S. Pat. No. 2,891,920, so as to obtain polymers having non-reactive terminal groups.

The solids content of the emulsions of the present invention generally is from about 1% to about 50% by weight of the total composition, but preferably is from about 10% to about 35% by weight of the total composition.

Emulsions of this type are useful for treating textiles and provide the added advantage that they can be used in combination with reactive and/or fugitive organic finishes.

In the method for treating textiles, the liquid composition (either the aminofunctional polysiloxane or an aqueous emulsion thereof) is applied to at least one surface of the textile in any suitable manner such as by dipping, spraying or brushing. The applied liquid composition is then heated to a temperature of from above room temperature to less than the melting or decomposition temperature of the textile fabric. Heating may be done by any suitable method or combination of methods, but preferably is done by passing the coated textile fabric through a hot air oven. The coated fabric should be heated for an amount of time sufficient to evaporate any water that is present.

The method for treating fabrics also includes the use of the aminofunctional polysiloxanes of the present invention as a fabric softener in a clothes washing procedure, for example, in the rinse and dry cycles of an automatic washer.

It should be understood that the method for treating textile fabric may be used to modify an end product textile or an intermediate textile. For example, it is within the intended scope of the present invention to modify a fiber or filament at any point during or after its preparation and subsequently fabricate an article such as a yarn, a fabric or a garment from said modified fiber or filament. Alternatively, a fabric or a garment may be fashioned from a fiber or filament and, subsequently, treated according to the method of the present invention.

In order to better enable the artisan to practice the present invention the following examples are provided by way of illustration. All parts and percentages are by weight unless otherwise stated.

EXAMPLES

Example 1

There was added to a suitable flask, 1910 grams octamethylcyclotetrasiloxane, 39 grams hexamethyldisiloxane, and 12 grams potassium silanolate. The mixture was agitated and heated to 95° C. at which time 31 grams aminoethylaminopropyltrimethoxysilane was added. Thereafter, the mixture was heated to 180° C. to equilibrate. When the equilibration was completed, the reaction mixture was cooled and 8 grams of water was added to hydrolyze any methoxy groups present. Methanol resulting from the hydrolysis was removed upon heating. Approximately 0.7 gram WV-6 was then added to neutralize the catalyst and the mixture stripped to 210° C. under 20 mm Hg vacuum. Next, about 2 grams NaHCO₃ and 4 grams silyl phosphate were added at about 180° C. and the mixture stripped to 250° C. The reaction mixture was then cooled and filtered through Celite #545 to obtain a slightly yellow fluid having a viscosity of 800 centipoise at 25° C. No reactive terminal groups could be detected.

Example 2

There was charged to a suitable flask, 1910 grams octamethylcyclotetrasiloxane, 26 grams hexamethyldisiloxane and 25 grams potassium silanolate. The mixture was agitated and allowed to equilibrate at 180° C. After 2 hours, 35 grams aminoethylaminopropyltrimethoxysilane was added and equilibration was continued at 180° C. for an additional 6 hours. When the equilibration was complete, the reaction mixture was cooled and 10 grams of water added to hydrolyze any methoxy groups present. The mixture was heated to 165° C., 22 grams of hexamethyldisiloxane was added, and the mixture was then allowed to equilibrate for an additional six hours at 165° C. About 2 grams WV-6 was then added to neutralize the catalyst. The resultant fluid had a viscosity of 280 centipoise at 25° C., 0.01 weight percent methoxy groups, and 0.17 amine equivalence.

Example 3

There was charged to a suitable flask, 571 grams of the aminofunctional polysiloxane prepared in Example 1, 571 grams of the aminofunctional polysiloxane prepared in Example 2, 36 grams hexamethyldisiloxane, 30 grams potassium silanolate, and 1 gram potassium hydroxide as catalyst. The mixture was agitated and allowed to equilibrate at 180° C. for 5 hours at which time about 4 grams WV-6 was added to neutralize the catalyst. The mixture was cooled and thereafter stripped to 160° C. at 20 mm Hg and filtered through Fuller's earth and Celite #545 to obtain a fluid having a viscosity of 75 centipoise at 25° C. and 0.16 amine equivalence.

Example 4

There was admixed in a suitable flask, 1810 grams octamethylcyclotetrasiloxane, 180 grams hexamethyldisiloxane, and 40 grams potassium silanolate. The mixture was agitated and allowed to equilibrate at 165° C. for 2 hours at which time the mixture was cooled and 300 grams aminoethylaminopropyltrimethoxysilane was added. Equilibration was then continued at 165° C. for an additional 6 hours. The mixture was cooled and 75 grams water was added to hydrolyze any methoxy groups that were present. One gram KOH was added and methonol resulting from the hydrolysis was removed upon heating at 160° C. After the equilibration was complete the KOH catalyst was neutralized and the reaction mixture stripped at 5 mm Hg to 200° C., thereby providing an aminofunctional polysiloxane having a viscosity of 103 centipoise at 25° C. and 1.5 amine equivalence.

Example 5

There was added to a suitable flask, 3067 grams octamethylcyclotetrasiloxane, 350 grams of the aminofunctional polysiloxane prepared in Example 4, 100 grams hexamethyldisiloxane, and 1.5 grams KOH catalyst. The mixture was agitated and allowed to equilibrate at 160° C. for 6 hours and thereafter stripped to 160° C. at 20 mm Hg. The catalyst was neutralized and the fluid filtered through Fuller's earth and Celite #545 to obtain a fluid having a viscosity of 97 centipoise at 25° C., but only 10% of the amine content of Example 4 (e.g. 0.15 amine equivalence).

Example 6

An emulsion was prepared by blending a mixture of 182 grams of the aminofunctional polysiloxane prepared in Example 3, 26 grams Pluronic F68, 20 grams Pluronic P123, 30 grams Triton X405, and 472 grams water, and thereafter homogenizing the blended mixture to form an emulsion.

The resultant emulsion was applied to various textile fabrics and was found to impart good hand to the fabrics.

Example 7

An emulsion was prepared by blending a mixture of 200 grams of the aminofunctional polysiloxane prepared in Example 4, 57 grams Triton X405, 10 grams Ethoquad C/25, a small amount of acetic acid (approximately 1 mol per calculated mol amine), and 733 grams water; and thereafter homogenizing the blended mixture to form an emulsion.

The resultant emulsion was applied to various textile fabrics and was found to impart good hand to the fabrics.

Example 8

There was blended 600 grams octamethylcyclotetrasiloxane, 275 grams of an aminofunctional siloxane represented by the average formula $T'(D)_{13}(OCH_3)_3$ where $T'$ is an aminopropylaminoethyl silsequioxane unit, 75 grams hexamethyldisiloxane, 150 grams Triton X405, and 25 grams Hyamine 1622. Next, 1365 grams of water was charged to the blend and an emulsion prepared by homogenization at 6000 psig. The homogenized emulsion was then placed in a 5 liter round bottom glass vessel equipped with stirrer, thermometer, heating mantle and condenser. There was then added an effective amount of KOH polymerization catalyst. Polymerization was effected at about 80° C. while agitating the emulsion over a period of seven hours. When polymerization was complete, the catalyst was neutralized with an effective amount of acetic acid. The resulting emulsion had an amine equivalence of 0.6 and 35% by weight solids.

We claim:

1. A substantially trialkylsiloxy terminated polysiloxane composition having at least one amino or substituted amino group linked to at least one trifunctional siloxy unit of said polysiloxane through an alkylene bridge wherein at least about 50 mole percent of aminofunctional siloxy units are trifunctional siloxy units and the amine equivalent of said composition ranges from about 0.1 to about 2.5.

2. A polysiloxane composition having the general formula

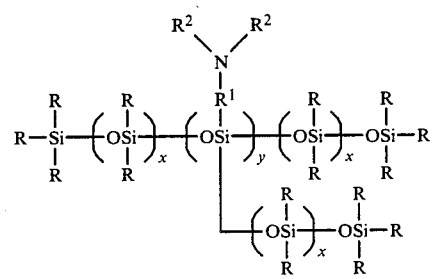

where each R is an independently selected substituted or unsubstituted hydrocarbon radical; each $R^1$ is an independently selected divalent arylene, alkarylene or alkylene radical; each $R^2$ is independently selected from hydrogen, substituted and unsubstituted hydrocarbon radicals, and amino radicals of the formula $-R^1N(R^2)_2$, where $R^1$ and $R^2$ are as previously defined; each x is an independently selected integer equal to or greater than zero; y is an integer equal to or greater than 1; and the viscosity is from about 10 centipoise to about 5000 centipoise at 25° C.

3. A polysiloxane composition as in claim 2, wherein $R^1$ is a divalent alkylene radical of the formula $-C_nH_{2n}-$, where n has a value of from 1 to 10.

4. A polysiloxane composition as in claim 3, wherein n equals from 3 to 6, inclusive.

5. A polysiloxane composition as in claim 3, wherein one of the $R^2$ radicals bonded to nitrogen is hydrogen and the other $R^2$ radical bonded to nitrogen is a radical of the formula $-(CH_2)_nNH_2$, where n is an integer from 1 to 10, inclusive.

6. A polysiloxane composition as in claim 5, wherein n of the formula $-(CH_2)_nNH_2$ equals from 2 to 4, inclusive.

7. A polysiloxane composition as in claim 6, wherein the $-R^1N(R^2)_2$ radical is aminoethylaminopropyl.

8. A polysiloxane composition as in claim 2, wherein the viscosity is from about 50 centipoise to about 1500 centipoise at 25° C.

9. A polysiloxane composition as in claim 5, wherein the viscosity is from about 100 centipoise to about 750 centipoise at 25° C.

10. A polysiloxane composition as in claim 2, wherein at least about 50 mole percent of the aminofunctional siloxy units are trifunctional siloxy units.

11. A polysiloxane composition as in claim 5, wherein at least about 75 mole percent of the aminofunctional siloxy units are trifunctional siloxy units.

12. A polysiloxane composition as in claim 2, wherein the amine equivalent of said polysiloxane ranges from about 0.1 to about 2.5.

13. A polysiloxane composition as in claim 5, wherein the amine equivalent of said polysiloxane ranges from about 0.5 to about 1.5.

* * * * *